Sept. 13, 1955  Z. M. SHAPIRO  2,717,915
APPARATUS FOR PRODUCTION OF PURIFIED METALS
Filed Nov. 13, 1952  3 Sheets-Sheet 1

FIG. I.

INVENTOR
ZALMAN M. SHAPIRO
BY
Roland A. Anderson
ATTORNEY

Sept. 13, 1955  Z. M. SHAPIRO  2,717,915
APPARATUS FOR PRODUCTION OF PURIFIED METALS
Filed Nov. 13, 1952  3 Sheets-Sheet 3

INVENTOR
ZALMAN M. SHAPIRO
BY
Roland A. Anderson
ATTORNEY

United States Patent Office 2,717,915
Patented Sept. 13, 1955

2,717,915
APPARATUS FOR PRODUCTION OF PURIFIED METALS

Zalman M. Shapiro, Pittsburgh, Pa., assignor, by mesne assignments, to the United States of America as represented by the United States Atomic Energy Commission Application November 13, 1952, Serial No. 320,315

16 Claims. (Cl. 13—31)

This invention relates generally to the production of purified metals and more particularly to an improved method and apparatus for producing a mass of purified metal by the thermal decomposition of a compound thereof. In general, the invention is directed toward the production of crystal bar zirconium, although it may be employed in the production of hafnium, titanium or other metals, the halides of which are adaptable to thermal decomposition separatory methods. Special requirements in the use of some purified metals, such as zirconium, often demand that they be capable of arc melting, be ductile, be easily workable and be corrosion-resistant, all of which entails special handling steps during the purification of the same from a relatively impure starting material. Heretofore, quantity production of such a purified metal has been difficult due to the small size of the purification apparatus employed and to the limitations of the conventional processing steps. As a result the cost of the purified metal has been comparatively great and the output per unit of time from a unit of apparatus has been comparatively small.

As is known, zirconium is an excellent getter for gases such as nitrogen, oxygen and carbon dioxide and unless it is purified in a suitable environment the resulting crystal bar may not be corrosion-resistant. Moreover, the sponge material from which the purified metal is prepared is pyrophoric under certain conditions and thus constitutes a fire hazard. In addition, the thermal decomposition takes place in a corrosive environment under relatively high temperatures and reliable sealing of the several parts of the apparatus must be provided without introduction of any contaminants into the purified metal being produced. Furthermore, the purified metal has appreciable weight and since it is deposited upon hot wire filaments, or starting wires, strips or other such devices, which necessarily must be capable of handling large currents, both the mechanical and electrical characteristics of the equipment must be properly chosen. Accordingly, special electrode tips and supports of suitable mechanical strength and electrical conductivity are needed. Therefore, it is these as well as other characteristic limitations of the apparatus and processes formerly employed which it is the purpose of my invention to overcome.

The invention has as an object the provision of an improved method and apparatus for purifying metals by thermal decomposition procedures.

A second object is to provide an improved apparatus suitable for quantity production of purified zirconium by the thermal decomposition of a zirconium halide.

A third object is to provide an improved reusable materials container for containing charges of a crude metal material and for growing bars of a purified metal therefrom.

A fourth object is to provide an improved arrangement of an elongated member on which purified metal is deposited.

A further object is to provide an improved auxiliary apparatus for supplying a halogen vapor to a materials container housing a hot wire filament.

A further object is to provide an improved means for maintaining a desired temperature upon metals undergoing a purification treatment through the maintenance of suitable temperatures at all portions of the container for such metals and with the simultaneous prevention of condensation of vapors at locations detrimental to the purification treatment.

Still another object is to provide an improved sealing arrangement for a materials container having a corrosive medium therein.

A further object is to provide an improved, non-contaminating, sealing means, consisting of gold, and mounted adjacent the closure portions of a thermal decomposition metal treating apparatus which is subjected to corrosive vapors, to high temperatures, to high vacuum, or to a combination of these factors.

Other objects and advantages will become apparent as the description proceeds and when read in conjunction with the accompanying drawings in which Figure 1 is a view, partly in section, showing an apparatus in which the deposition of purified metal according to the process may be carried out.

In the practice of the invention, when producing crystal bar zirconium, for example, a crude zirconium sponge may be separately manufactured as by the well-known Kroll process involving the reduction of zirconium tetrachloride with magnesium. This sponge, which forms the starting material of my process, is a porous, rather pyrophoric mass containing small amounts of magnesium and magnesium chloride. When subjected to iodine vapor, a portion of the sponge reacts to form zirconium tetraiodide and in the presence of a suitable hot wire filament the zirconium tetraiodide decomposes on that filament, or starting wire, leaving a deposit of purified zirconium and releasing iodine which then migrates back to the sponge where it reforms more zirconium tetraiodide which in turn then decomposes so that the process may be continually repeated. Thereafter, a portion of the apparatus, later to be described, is dismantled from the temperature controlling portion of the apparatus and moved to a separate location at which it may be safely opened, with appropriate precautions, in order to remove the purified bars and the residue of highly pyrophoric sponge starting material. As a result of these several steps the commercial production of highly purified zirconium, or other metal, may be effected with concomitant savings due in part to the large quantity which may be deposited at a single cycle of operation. The resulting efficiencies of my large scale production are not possible with the laboratory glass structures and small scale metal structures in vogue prior to this invention.

Figure 1:
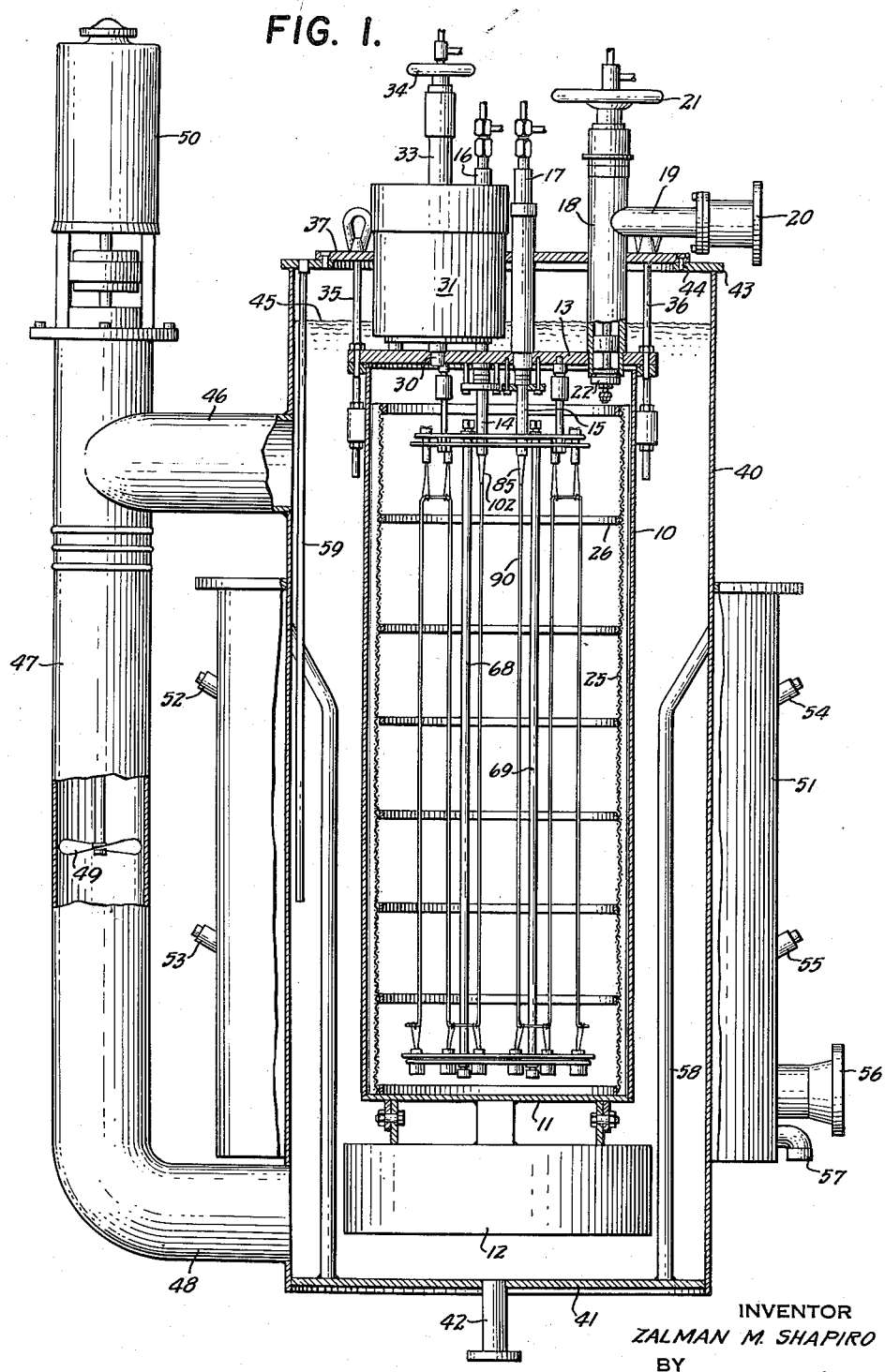

Referring now to Figure 1, a self-contained, reusable, materials container is shown mounted within its cooperating temperature controlling apparatus, in position for carrying out the process of the invention. It will be understood that such container has been previously loaded with materials at a separate location and will be subsequently unloaded, at still another location, following the deposition of the purified material upon the starting wire.

This materials container comprises a cylindrical wall member 10 having an imperforate bottom member 11 to which is attached a massive weight 12. At its top the container is provided with a removable, apertured top plate 13 serving as a support for the several cooperating apparatus elements, later to be described. Between the container wall and its top, special, non-contaminating seal means are provided in order to maintain a high vacuum, in the order of $10^{-5}$ to $10^{-6}$ mm. of mercury, within the container and at the same time to resist the corrosive action of the hot metal halide vapors within said container. The container preferably is constructed of any non-contaminating material resistant to the general corrosive action of hot metal halides and halogens. Materials found to be satisfactory may comprise Hastelloy-B, a commercial alloy having approximately 65% nickel, 30% molybdenum, 5% iron, or Inconel, a commercial alloy having approximately 80% nickel, 13% chromium, and 7% iron. Special portions of the container and its component parts subject to the greatest corrosive action, may be made of molybdenum, tungsten, tantalum or similar temperature and corrosive resistant material.

Figure 3:
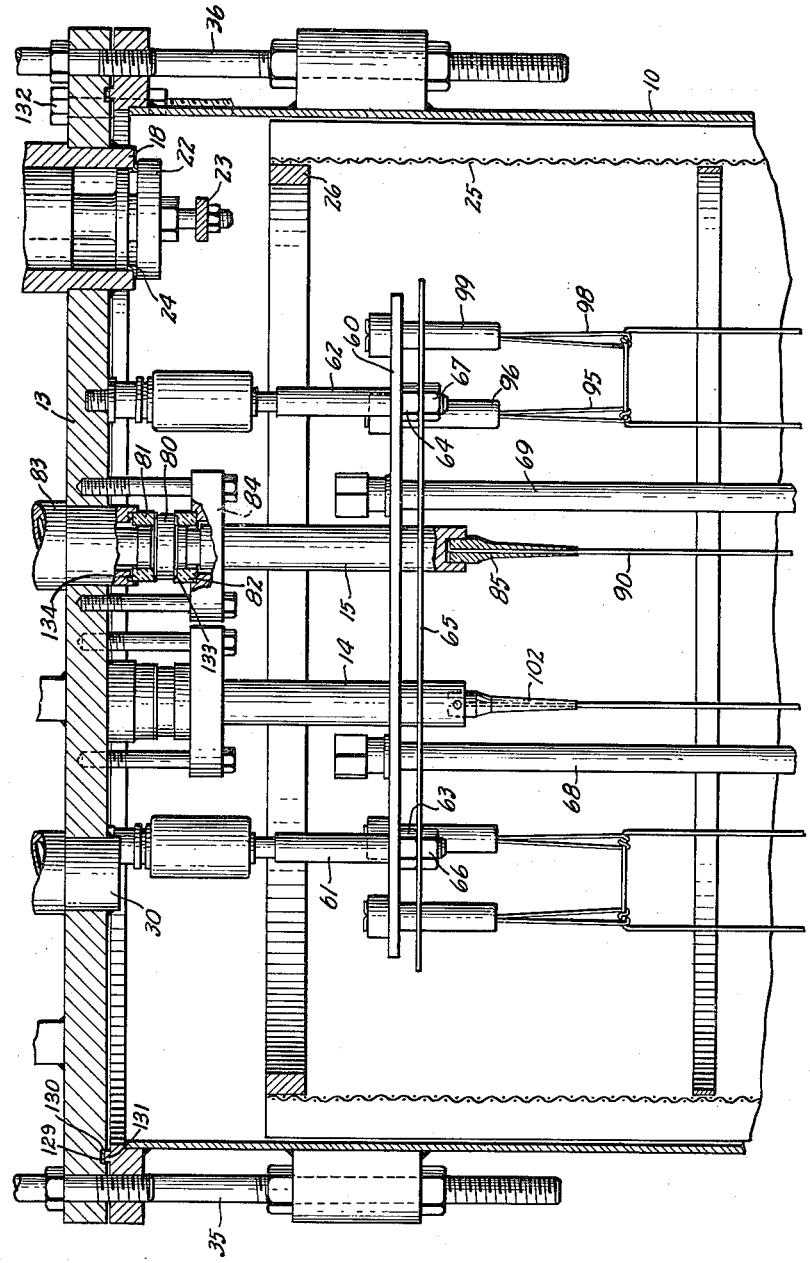
Figure 3 is a fragmentary view, partly in section, of the upper portion of the removable materials container showing a preferred arrangement for mounting the elongated starting wire.

The container wall is provided adjacent its top with a peripheral flange having a circular boss 131 thereon which is adapted to seat in a matching peripheral groove 129 on the lower surface of plate 13, as shown in Figure 3. The plate and flange also are provided with matching holes adjacent their edges in order to receive conventional bolt means for securing the same together with a close fit.

As an important feature of the invention, a seal material which is simultaneously resistant to the heat under which the process is to be conducted and to the extremely corrosive action of the vapors contained within the apparatus is provided and is interposed between the boss on the flange and the groove in the top plate. It has been found that gold is eminently suited for this purpose and the invention therefore comprehends the use of a ring 130 of gold having a suitable thickness which is adequate to seal the flange and plate under the vacuum, heat and corrosive conditions which are inherent in carrying out the process. Moreover, gold has been found to be non-contaminating insofar as the production of a purified metal within the materials container is concerned. Conventional sealing materials such as lead, or aluminum, or organic compositions have been found to be inadequate in one or more of these essential respects.

Extending through plate 13 in suitably insulated and sealed relation thereto is a pair of heavy-duty electrodes 14 and 15 adapted to have bus bars (not shown) connected thereto at an external location, as at neck portions 16 and 17. At their extreme outer ends these electrodes are provided with cooling fluid connections and at their inner ends, within the materials container, are provided with suitable electrode tips for holding the starting wire. Both the electrodes and the tips are constructed of corrosion-resistant materials. Suitable tips for this usage are described in my copending applications for United States Letters Patent, Serial Numbers 257,308 and 257,309, filed November 20, 1951 and issued on May 5, 1953 as Patent No. 2,637,297 and No. 2,637,298, respectively.

Further extending through plate 13 in sealed relation thereto is a valve housing 18 provided with a lateral conduit 19 and a coupling to which is attached a guard valve assembly 20. This guard valve in turn is adapted to be detachably connected to a suitable high vacuum apparatus at the initial stage of the process, as will later be described. Customarily the evacuation of the materials container is effected prior to the positioning of the same in the assembly shown in Figure 1 and thus the vacuum source is not shown therein. However, it is within the purview of the invention to attach the vacuum source to guard valve 20 when the apparatus is in the position here shown, if the user so desires. A suitable, non-rising stem valve which may be actuated by handwheel 21 and which is provided at its lower valve seat with the special gold sealing means of this invention is provided for opening and closing communication between conduit 19 and the interior of the materials container. As generally indicated in Figure 3, the valve body terminates in a valve head 22 adapted to be pulled upwardly against the lower end of the valve casing 18 and to be moved downwardly until it abuts a fixed limiting stop 23 suitably mounted rigidly within the confines of the materials container.

In the event that my special gold seal should become worn or unduly flattened, guard valve 20 serves to further insure against inleakage of gas or vapor through the vacuum outlet conduit.

For the purpose of providing a seal capable of holding the necessary high vacuum in the hot corrosive environment the invention porvides a malleable metal ring seal 24, preferably gold, disposed on the sealing edge of the valve head 22 and preferably positioned on the movable valve member. At the outer end of the valve housing, suitable connections for a cooling medium may be provided since the non-rising valve stem does not interfere with such fixed connections. This use of a valve having cooled outer extremities, as well as the cooling of the outer extremities of the electrodes and halogen generator valve later to be described, contributes in measureable degree to the efficiency of the process in that conventional sealing gaskets may be employed without destructive effects thereon due to conduction of heat from the interior of the hot materials container. In this way, possible inleakage of contaminating gas is prevented at each of these locations as well, should my special gold seal become worn or unduly flattened.

Figure 2:
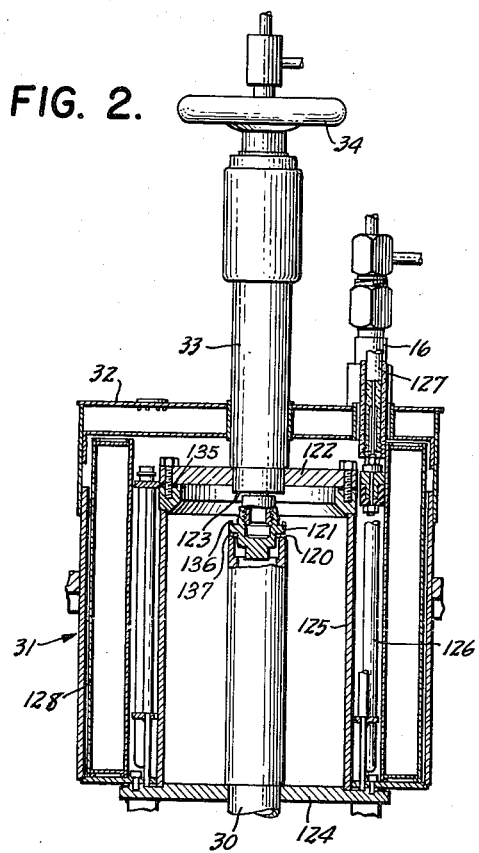
Figure 2 is a view, partly in section, of an improved container for a halogen material employed in the process.

Further extending through top plate 13 and suitably sealed therein is a conduit 30 leading from the interior of an auxiliary container 31 which is fixedly mounted on the upper side of the top plate. This container which is adapted to hold the supply of halogen material is provided with a removable cover member 32 and with a valve housing 33 (Figure 2). Within such housing a non-rising stem valve actuatable by a rotary handwheel 34 is located and at its outer end the valve housing is provided with suitable connections for circulating a cooling medium therethrough.

The thus described apparatus is supported as a unit by means of suitable tie rods 35 and 36 upon an outer cover plate 37, the rods being provided at their upper ends with eye members into which a crane hook may be engaged for lifting and carrying the apparatus as a single unit. Moreover, in addition to the tie rods which preferably pass loosely through apertures in top plate 13 and the upper flange of container 10 and are anchored in bosses at the side of container 10, a plurality of conventional bolts and nuts, such as that shown at 132 in Figure 3, may be disposed circumferentially of the plate and flange to join the two together. However, when lifting stresses imposed upon the seals between the container 10 and its top cover 13 are not regarded as significant, the tie rods may as shown, be threaded and provided with nuts in order to reduce the number of other fastening bolts needed.

As a significant part of my improved apparatus, means are provided for controlling the application of heat to and removal of heat from the described apparatus. One convenient commercial form of such means comprises a fixed tank or housing having a cylindrical outer wall 40, a bottom member 41 with a drain pipe 42 therein, and a top ledge member 43 upon which the cover plate 37 of the removable unit is loosely positioned as by means of a plurality of pins 44.

This housing is adapted to contain a circulating body of a heat transfer medium, such as a salt bath which generally is maintained at a temperature of about 250°

C. to 350° C. and which rises to a level generally indicated at 45 and completely submerges the materials container above described. One suitable composition for such a bath comprises a mixture of 50% sodium nitrate and 50% potassium nitrite. From the upper portion of the housing a lateral conduit 46 leads to a standpipe 47 which in turn is connected to a lower portion of the housing by a lateral conduit 48. A suitable impeller 49, driven from a motor 50, serves to effect the desired circulation of the bath.

As will later be apparent, the heat radiated from the hot starting wire and purified metal deposited thereon would cause a continuing rise in temperature of the bath and means therefore are provided to remove excess heat. A suitable form of such means may comprise a jacket 51, surrounding an appreciable portion of the housing 40, intermediate the ends thereof and provided with a plurality of jets 52, 53, 54, and 55, adapted to direct streams of water or other liquid media against the outer surface of such housing. A vapor vent 56 and a condensate outlet 57 also are provided for the cooling jacket.

In order to guide the removable materials container and its attached weight into proper position within the housing 40, a plurality of fixed guide rods 58 may be employed and for control purposes a fixed thermocouple well 59 may also be rigidly mounted in the same housing. Due to the relatively high specific gravity of the salt bath and the concomitant buoyancy of the evacuated materials container, the weight attached thereto serves to hold the container securely in place. When first placed in housing 40, usually as a solid, the salt mixture may be brought up to temperature by suitable separate heating means, for example, placed within the confines of the housing beneath the surface of the salt mixture. Customarily the molten bath, when once brought up to temperature, is used repeatedly in carrying out successive cycles of my process and when it is desired to replace the same for maintenance or other reasons, it can then be drained off through pipe 42. As will be noted, the molten bath is maintained under atmospheric pressure with the consequence that no special sealing is required between ledge 43 and cover plate 37.

Figure 4:
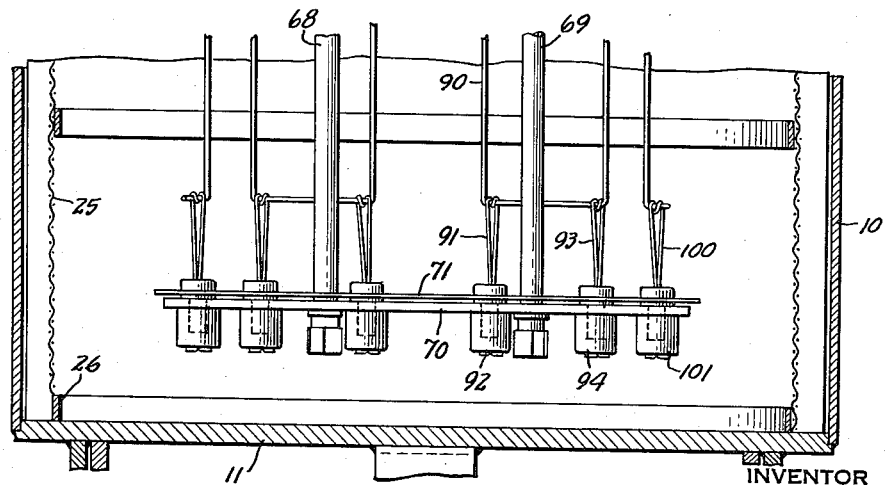
Figure 4 is a fragmentary view, partly in section and to a smaller scale, of the lower portion of the removable materials container and showing a preferred arrangement for mounting the starting wire.

Referring now to Figures 3 and 4, the starting wire and associated elements which serve to provide a support for the purified metal produced in the practice of the invention are shown mounted in insulated relation within the materials container.

Within the container and spaced from wall 10, in order to provide an annular space for the starting material, such as zirconium sponge, is a foraminous cylindrical member 25, preferably formed of molybdenum screen and resting loosely upon the container bottom plate 11. This screen is provided with a plurality of reinforcing ferrules 26 and is of sufficient mechanical strength to hold a blanket of the material which can be readily and uniformly attacked by the halogen vapor admitted to the materials container. An apertured upper support plate 60 formed of a corrosion-resistant metal preferably is supported by suitable metal rods 61 and 62 from the top plate 13 and is detachably affixed by means of nuts 63 and 64. Spaced inwardly from the support plate is a thin, corrosion-resistant, refractory metal plate 65. This plate which may be formed, for example, of molybdenum, tantalum or tungsten, is likewise detachably affixed to the metal rods by nuts 66 and 67 and serves essentially as a heat reflector and shield. Extending downwardly from the upper support plate 60 is a plurality of rigid spacer rods 68 and 69 whose lower ends, as shown in Figure 4, provide a rigid support for a lower support plate 70 with the result that the starting wire which is to be arranged between the upper and lower support plates thus is relieved from tension stresses. Moreover, the rigid support provided by these spacer rods also serves to prevent lateral shifting of the parts of the assembly due to electromagnetic stresses imposed thereon during the flowing of the heavy currents through the parallel adjacent loops of the filament. These rods also may be adjustably affixed by suitable nuts to hold these plates in the desired spaced relationship. A second and similar thin plate 71 serving also as a heat reflector and shield is likewise disposed inwardly from the lower support plate 70.

As seen in Figure 3, the electrode 15 is provided with a central portion 80 disposed between two annular ceramic insulators 81 and 82, the upper of which abuts against the lower end of the insulator housing 83 which extends in sealed relation through upper plate 13. The lower annular insulator 82 is mounted upon a corrosion-resistant, metal, retaining bracket 84 which is supported by suitable bolts from the plate 13. As in the sealing of the valve 22, a corrosion-resistant, refractory malleable metal sealing ring 134, preferably of gold, is provided, on each electrode, between the lower end of the externally extending insulator housing of such electrode and the top of the adjacent annular insulator 81. Similarly, another such gold sealing ring 133 is provided between the central portion 80 of each electrode and the bottom of the adjacent annular insulator 81. This dual sealing ring structure is, as will be evident, provided for the purpose of insuring a reliable vacuum seal and for preventing the leakage of metal halide and halogen vapors into the electrode housing. At its lower end the electrode 15 serves to mount detachably an improved electrode tip 85 of the type mentioned and within which is securely mounted one end of an elongated starting wire or filament 90. As a result of the several cooperating features of the invention, it is possible to so festoon or arrange this single wire as to provide a plurality of loops therewith within the materials container. For example, one satisfactory arrangement has permitted the use of a fifty-foot length of wire 90 to be mounted so as to form six hairpin loops in series, with each leg of the hairpin being four feet in length. Wire 90 preferably is constructed of zirconium about 0.094 inch in diameter, although the precise material or size is not in itself a critical limitation. For example, the wire could also be constructed of tungsten, molybdenum or tantalum.

As shown in Figures 1, 3 and 4, wire 90 extends from tip 85 downwardly to a special wire keeper 91 which is anchored in an insulating ceramic thimble 92 on the lower plate 70, thence horizontally a short distance to another keeper 93 anchored by thimble 94, and then upwardly to a keeper 95 mounted by thimble 96 to upper plate 60 thus forming one hairpin loop.

In like manner the wire is further extended through another keeper 98 mounted in thimble 99, thence downwardly through keeper 100 mounted in thimble 101, and then connected through similar keepers, thimbles and loops, not fully shown, until it is fastened at its second end in electrode tip 102 mounted upon electrode 14. In this way the single wire may be fashioned into the desired number of series connected loops and provide an elongated surface upon which the purified metal may deposit, which surface, and consequently capacity of the apparatus, will be much greater than found in conventional single loop structures.

Figure 5:
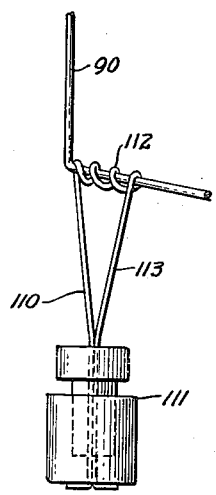
Figure 5 is a fragmentary view of a wire support keeper for holding the starting wire in extended position.

As noted from Figures 3, 4 and 5, a novel and satisfactory form of keeper may comprise a short length of wire, preferably of a material such as molybdenum, tungsten, or tantalum. The mounting means employed for the hot wire filament must provide adequate mechanical support but must be so designed as to convey away only the proper amount of heat so the filament does not develop a cold spot at the point of attachment. Erosion and failure of the filament easily take place in the hot corroding metal halide and halogen vapors unless these problems are solved. In general, I have found that a keeper made of molybdenum wire 0.030 inch in diameter and twisted in a helical coil comprising a full 360° helical turn will provide a satisfactory means through which the filament may be threaded. However, other configurations, one of which is shown in Figure 5 with more than a 360° helical turn, may be used when wires of different diameter, or of material having a different coefficient of heat conductivity, or operating under different temperature conditions, are to be employed. For example, one end 110 of the keeper wire may be bent at its extremity so as to anchor it on one side of a ceramic thimble structure, shown generally as 111, and through a small aperture in which said wire is adapted to be threaded. The wire then is provided with the predetermined helical twist section 112 and the second end 113 is thereupon threaded through the thimble and anchored similarly to the first mentioned end.

Considering now the auxiliary container 31 shown in Figures 1 and 2, it will be noted that the open-ended conduit 30 which serves as a downcomer for halogen vapor is provided at its upper end with a valve seat 120. A double acting valve head 121, provided with seating surfaces having gold sealing means 136, 137 affixed thereto, extends through a valve housing 33 and is adapted to contact valve seat 120 when closing off communication between this container and the materials container. Valve housing 33 extends in suitably sealed relation through a heavy cover plate 122 and is provided at its lower extremity with a valve seat 123 against which the valve head 121 is adapted to seat when the two containers are in communication. This valve arrangement, which may be called the hopper or halogen feeder valve, includes a non-rising stem valve actuatable from handwheel 34 and provided with suitable cooling fluid connections. Container 31 includes a bottom plate 124 and a side wall 125 to which the removable cover plate 122 is suitably sealed, as by means of gold ring seals 135 such as described above with respect to the sealing of top plate 13 upon materials container 10.

A removable resistance heater generally shown at 126, adapted to be connected to an electrical source through a suitable removable high temperature insulator 127, surrounds wall 125 and is supplied with electrical current in a conventional manner when it is desired to vaporize a halogen charge contained within the container. A removable cover 32 containing suitable insulating material is provided for access to the removable heater 126 and removable high temperature insulator 127, and for providing cooling and insulating of the container 31 during a cycle of operation. For the latter purpose the space between the insulating spacer 128 and the wall 125 when the heater 126 may be used. Suitably protected thermocouples or thermometers may be used both internally and externally of wall 125 whenever desired.

Having thus described the general construction of the improved apparatus, the following preferred mode of operation may be noted in the purification of a zirconium metal for the manufacture of a corrosion-resistant, arc meltable crystal bar. Similar steps would be followed in the production of purified hafnium, titanium or other metals, although the starting materials and temperatures employed would be suitably varied in such cases.

With the materials container and attached halogen container in empty cooled condition, a charge of iodine, preferably in solid form, is placed in container 31 with a removable annular receptacle, not shown, filled with Dry Ice which has been substituted for the heater 126. Plate 122 is then sealed in place with the gold seal ring tightly compressed against the flange and with valve 121 sealed against valve seat 120, whose gold seal ring is likewise tightly compressed. The mass of zirconium sponge meanwhile has been loaded in wet condition between screen 25 and wall 10 and the starting wire 90 has been arranged as above described. Plate 13 is then sealed against the flange on container 10 with the gold seal ring therebetween tightly compressed. Vacuum thereupon is applied to guard valve assembly 20 with valve head 22 in open position, the thus described apparatus meanwhile being disposed in a separate furnace, not shown.

Heat is slowly applied to the materials container 10 until a temperature of about 100° C. to 115° C. is reached by the sponge. Meanwhile, the vacuum is dehydrating that sponge and is outgassing container 10. In no event is the temperature permitted to reach a value at which a reaction between the sponge and water vapor could take place. After the sponge has been dehydrated, and while the halogen container is kept cool, valve 121 between the halogen container and the materials container is opened to allow the halogen container to be outgassed and prepared for operation. During this stage the temperature of the sponge may be safely raised to about 350° C. After outgassing the halogen generator, and after the sponge has attained a temperature of about 350° C., the valve 121 is back seated upon valve seat 123 and the receptacle containing the Dry Ice is removed and the heater 126 is placed in the same position, and current is supplied to the heater element 126.

Upon supply of current to heater 126, the iodine sublimes into evacuated materials container 10 and reacts with the heated sponge, the outlet valve 22 and guard valve 20 meanwhile having been closed. As the iodine sublimes into container 10, the temperature of the sponge is maintained at approximately 350° to 375° C. When the sublimation is completed, the valve 121 is again seated upon valve seat 120 and the entire unit is now charged ready for positioning in the assembly, illustrated by Figure 1, the hot salt bath having previously been heated to the normal temperature of about 300° C. As one advantageous feature of the halogen generator construction, a distillation of the iodine is effected and impurities which may be present in the original charge placed in container 31 are trapped therein as the sublimation takes place. This is due in large part to the indirect path which the halogen vapor follows in entering the downcomer 30.

By a crane or similar means, the prepared unit may now now be raised from the furnace and lowered into the hot salt bath within housing 40. Electrical current is then supplied to electrodes 14 and 15 and the starting wire 90 quickly attains a high temperature in the order of 1400° C. The zirconium tetraiodide whose vapor fills the container 10 accordingly undergoes thermal decomposition at all points along the wire or filament and leaves thereon a deposit of purified zirconium which in due time grows into a sizeable rod or bar, preferably in the order of an inch or more in diameter. Iodine released during this thermal decomposition returns to the sponge and again forms more metal compound which thereafter is decomposed on the growing wire.

As is known, a constantly increasing supply of electrical current must be provided during the growth of the bar and this may rise to the order of 1250 amperes in order to keep the large bar at the requisite temperature.

Use of this large current causes large amounts of heat to be radiated with a concomitant rise in temperature of all parts of the evacuated system as well as of the salt bath. The heat reflecting shields 65 and 71, which are preferably made of molybdenum, tungsten, or tantalum, in part serve to direct the radiated heat away from the portions of the vessel which are less resistant to the corrosive action of the metal halide and halogen vapors, particularly at higher temperatures. These shields thus serve to diminish the attack of these parts and the consequent transfer of impurities to the filament by the above-mentioned vapors and thus contribute to the purity of the deposited zirconium. The heat reflecting shields 65 and 71 in part also serve to direct the radiated heat away from the points of anchorage of the starting wire, but the fluid cooling connections to vacuum valve housing 18, electrode housings and iodine hopper valve housings 33 likewise serve significant purposes in prolonging the life of the seals, the life of the mechanical elements and in contributing to the general efficiency of the process. Especially significant is the fact that the design of hot materials container is such that it, including a portion of the electrode and valves, is submerged in the salt bath. Thus the entire vessel remains at the same temperature and condensation of the metal halide and halogen vapors in portions of the vessel which would ordinarily remain cooler is prevented. As a result the deposition process is not subject to being discontinued prematurely, a factor which greatly contributes to the general efficiency of the process. The fact that the entire hot materials container is submerged in the salt bath makes possible the more efficient removal of heat from the entire vessel and the maintenance of a uniform temperature even during the late stages of the process when an excessive amount of heat must be dissipated. When excessive heat begins to be radiated and conducted to the salt bath, moreover, the cooling jets of the jacket 51 are placed in operation and together with the circulation of the bath by impeller 49 this large amount of heat is dissipated.

Following growth of the elongated bars to the desired size, the electrical current to the heater 126 and to the electrodes 14 and 15 is interrupted. The assembly is then lifted from the salt bath and moved to a suitable separate apparatus where it can be cooled and opened under safety precautions. These precautions may include the use of a housing provided with means for blanketing the container with an inert gas, such as helium or argon, and provided with means for flooding the container with water as the vacuum is broken and the cover 13 is removed. The residue of zirconium sponge is highly pyrophoric. This residual sponge, as well as the charge of iodine, frequently can be reused after suitable washing and recovery treatment. Upon opening the materials container, the deposited crystal bar as well as the electrode tips and the several keepers are removed, and a new set of tips, keepers and wire is installed for the next cycle of operations. The thimbles which anchor the keepers frequently can be cleaned by abrasive treatment and also reused. After reloading and reassembly, the unit, therefore, is ready for the subsequent cycle of operations.

Having thus described my invention, it will be apparent that various changes in the construction and materials used, and in the sequence of steps employed, may be made without departing from the scope or intent thereof. Accordingly, it is not desired to limit the invention to the exact details shown, or description made, except as defined in the following claims.

What is claimed is:

1. Apparatus of the class described comprising in combination, a housing adapted to contain a heat transfer medium, a reusable container removably mounted in said housing in contact with said medium and adapted to contain a thermally decomposable metal compound, a removable top member for said container, a corrosion-resistant, heat-resistant metallic seal interposed between said container and said top member, means for evacuating said container, a starting wire assembly disposed in the container and means for supplying electrical current to said wire.

2. Apparatus as defined in claim 1, wherein said metallic seal comprises gold.

3. Apparatus of the class described comprising in combination, a housing adapted to contain a heat transfer medium, a container removably mounted in said housing in contact with said medium, means supporting a first material interiorly adjacent the wall of said container, an auxiliary container adapted to contain a second material, means for evacuating said containers, means for supplying said second material in vaporized form to said first container thereby to form a thermally decomposable compound within said first container, a starting wire disposed in said first container and means for supplying electrical current to said wire.

4. Apparatus of the class described comprising in combination, a housing adapted to contain a heat transfer medium, a container removably mounted in said housing in contact with said medium, means supporting an elongated blanket of a first material adjacent the container wall, an elongated starting wire having a plurality of loops supported generally parallel to said elongated blanket, means for supplying electrical current to said wire, an auxiliary container adapted to contain a second material, a conduit connecting said containers for supplying said second material to said first container, valve means in said conduit, a corrosion-resistant, heat-resistant metallic seal interposed between said valve and its cooperating valve seat, and means for evacuating said containers.

5. Apparatus as defined in claim 4, wherein said metallic seal comprises gold.

6. Apparatus of the class described comprising in combination, a housing adapted to contain a heat transfer medium, a container removably mounted in said housing in contact with said medium, means supporting an elongated blanket of a first material adjacent the container wall, an elongated starting wire having a plurality of loops arranged in series and supported generally parallel to said elongated blanket, means for supplying electrical current to said wire, an auxiliary container adapted to contain a second material, a conduit connecting said containers for supplying said second material to said first container, valve means in said conduit for selectively establishing communication between said containers, and means for evacuating said containers.

7. Apparatus of the class described comprising in combination, a housing adapted to contain a heat transfer medium, means for circulating said medium in said housing, means for cooling said medium, a closed evacuated container removably mounted in said housing and having its top submerged in said medium, said container being adapted to contain a first material, an auxiliary container adapted to contain a second material, a conduit connecting said containers for supplying said second material to said first container, a valve in said conduit, a starting wire disposed in said first container, and means for supplying electrical current to said wire, thereby to deposit said first material upon said wire in the presence of said second material, said heat transfer medium being adapted to supply heat to the container or receive heat radiated from said wire.

8. For use in a metal compound vaporizing and decomposition apparatus, a corrosion-resistant container adapted to be totally submerged in a heat transfer medium and comprising, a heat conducting outer wall, a foraminous member spaced inwardly of said wall for holding a metallic material therebetween, an imperforate heat conducting bottom member attached to said wall, a heat conducting top member removably attached to said wall, means extending through said top member for supply of a corrosive vapor into said container, and a corrosion-resistant, heat-resistant metallic seal interposed between said top member and said wall.

9. Apparatus as defined in claim 8, wherein said metallic seal comprises gold.

10. For use in a metal compound vaporizing and decomposition apparatus, a corrosion-resistant container adapted to be totally submerged in a molten salt heat transfer medium and comprising, a heat conducting outer wall, a foraminous member spaced inwardly of said wall for holding a metallic material therebetween, an imperforate heat conducting bottom member attached to said wall, a counterweight attached to said bottom member externally of the container, a heat conducting top member removably attached to said wall, means extending through said top member for supply of a corrosive halogen vapor into said container, and a corrosion-resistant, heat-resistant metallic seal interposed between said top member and said wall.

11. Apparatus as defined in claim 1 wherein said assembly includes a first support plate, a pair of electrodes mounted adjacent said plate, detachable tips attached to said electrodes, a second support plate, spacers between said plates for providing a fixed plate assembly, a starting wire affixed at its ends to said electrode tips and means attached to each of said plates for holding said wire in a plurality of loops arranged in series.

12. Apparatus as defined in claim 1 wherein said assembly includes a first support plate, a pair of electrodes mounted adjacent said plate, detachable tips attached to said electrodes, a second support plate, spacers between said plates for providing a fixed plate assembly, a starting wire affixed at its ends to said electrode tips and a plurality of separate keeper wires affixed at the ends to the adjacent one of said plates and terminating in an open coil spaced between said plates, said starting wire being threaded through said coil thereby to hold the starting wire in a plurality of loops arranged in series between said plates.

13. Apparatus as defined in claim 3 wherein said auxiliary container and means for supplying said second material comprises a corrosion-resistant iodine distilling unit having a centrally disposed downcomer terminating in an open valve seat within said unit, a wall member surrounding said downcomer and providing a space therebetween for said iodine, a floor member through which said downcomer extends, an apertured top member adapted to be sealed to said wall by means of a corrosion-resistant metallic seal, a valve means extending through said top member and adapted to seat adjustably upon the open valve seat, a corrosion-resistant metallic seal interposed between said valve seat and valve means and means surrounding said wall member exteriorly thereof for changing the temperature of said iodine.

14. Apparatus of the class described comprising in combination, a housing adapted to contain a heat transfer medium, a cooling jacket surrounding a portion of said housing, means for selectively introducing and removing a cooling fluid from said jacket, a reusable container removably mounted in said housing in contact with said medium and adapted to contain a first material, an auxiliary container adapted to contain a second material, a conduit connecting said containers, valve means adjacent one end of said conduit, means for evacuating said containers, means for vaporizing said second material, a starting wire disposed in the first container and means for supplying electrical current to said wire.

15. Apparatus as defined in claim 14 wherein said auxiliary container is mounted adjacent the top of said reusable container and is movable therewith as a unit.

16. Apparatus as defined in claim 14 wherein said housing is provided with a circulating passage having an impeller therein for circulating the heat transfer medium.

References Cited in the file of this patent

UNITED STATES PATENTS

| | | |
|---|---|---|
| 953,774 | Appelberg | Apr. 5, 1910 |
| 1,286,135 | Somermeier | Nov. 26, 1918 |
| 1,306,568 | Weintraub | June 10, 1919 |
| 1,329,457 | Carter | Feb. 3, 1920 |
| 1,671,213 | Van Arkel et al. | May 29, 1928 |
| 1,673,543 | Wirz | June 12, 1928 |
| 1,709,781 | DeBoer et al. | Apr. 16, 1929 |
| 1,751,408 | Ipsen | Mar. 18, 1930 |
| 1,794,810 | Van Arkel et al. | Mar. 3, 1931 |
| 2,086,825 | Simpson | July 13, 1937 |
| 2,356,237 | Geller | Aug. 22, 1944 |
| 2,476,916 | Rose et al. | July 19, 1949 |
| 2,551,341 | Scheer et al. | May 1, 1951 |
| 2,557,530 | Bancroft | June 19, 1951 |
| 2,637,297 | Shapiro | May 5, 1953 |
| 2,637,298 | Shapiro | May 5, 1953 |

OTHER REFERENCES

The Electrochemical Society Preprint 88–30 Oct. 17, 1945, pages 357–366.

Metal Industry, Oct. 18, 1946, pages 319–322.

Metal Progress, Feb. 1949, pages 193–194.